United States Patent [19]

Draves

[11] Patent Number: 5,778,949
[45] Date of Patent: Jul. 14, 1998

[54] ADJUSTABLE ROUTER

[76] Inventor: Theodore K. Draves, 10221 Bridge Lk Rd., Clarkston, Mich. 48348

[21] Appl. No.: 516,380

[22] Filed: Aug. 17, 1995

[51] Int. Cl.$^6$ ..................................................... B27C 5/10
[52] U.S. Cl. .................. 144/48.6; 33/27.032; 33/27.03; 144/136.95; 144/145.5; 144/371; 144/137
[58] Field of Search ..................... 144/48.6, 134.1, 144/136.1, 137, 136.95, 154.5, 371; 409/182; 33/27.023, 27.03

[56] References Cited

U.S. PATENT DOCUMENTS

| | | | |
|---|---|---|---|
| 3,635,268 | 1/1972 | Lange | 144/136.95 |
| 4,194,543 | 3/1980 | Cotton | 144/137 |
| 4,911,214 | 3/1990 | Scott | 144/137 |
| 5,038,841 | 8/1991 | Larmon | 144/371 |
| 5,515,611 | 5/1996 | Maldonado | 144/371 |

*Primary Examiner*—W. Donald Bray

[57] ABSTRACT

An adjustable router comprised of a lower track having an aperture formed therethrough. The aperture allows the elongated lower track to be pivotally secured to a board by a nail. One of two side surfaces of the lower track has an indicating arrow thereon. A router track has a circular base secured to an end portion thereof. The circular base has an aperture formed therethrough. The router track is adapted for removable slidable coupling with the lower track. The elongated router track has two locking knobs for adjustable engagement with the lower track. One of two side surfaces has a ruler thereon aligning with the indicating arrow on the elongated lower track.

1 Claim, 4 Drawing Sheets

PRIOR ART

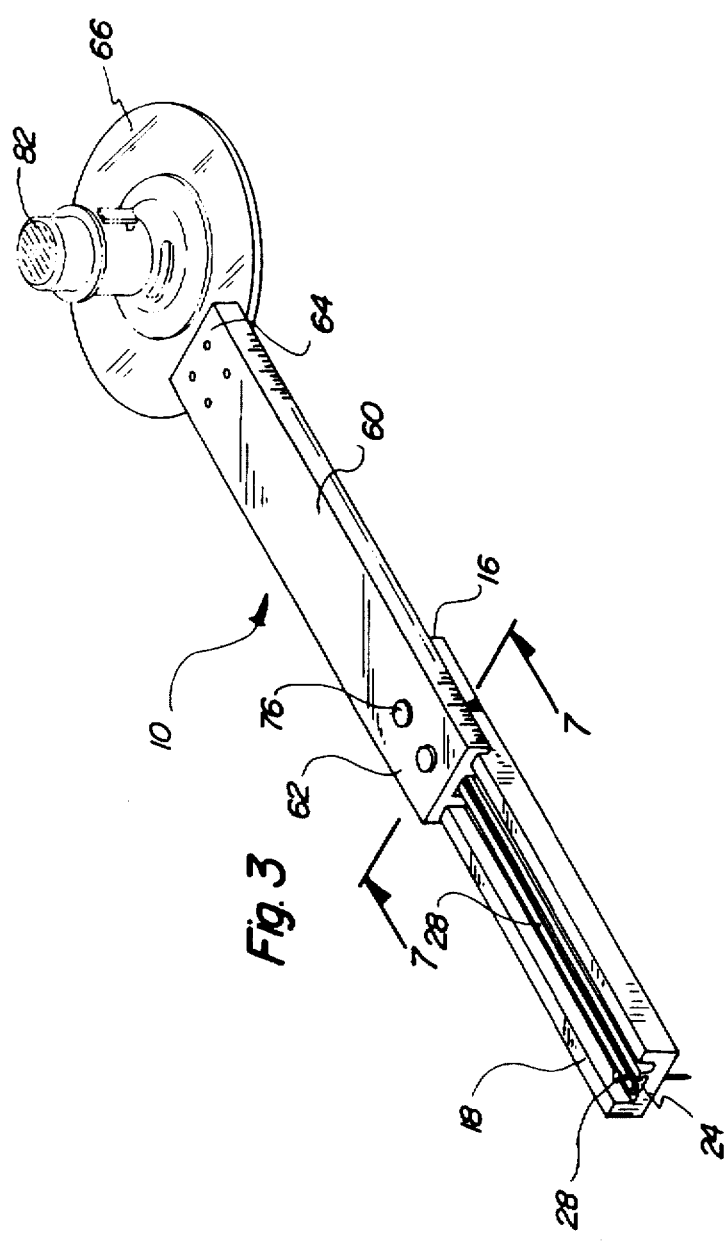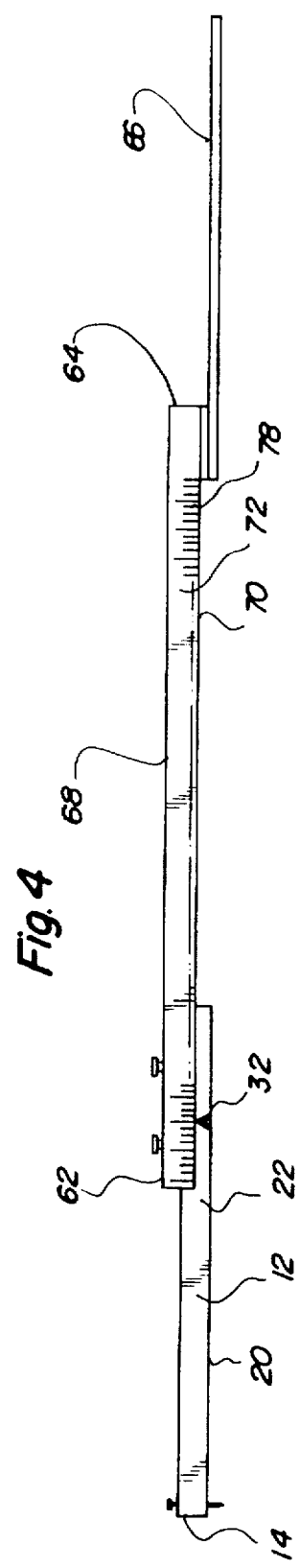

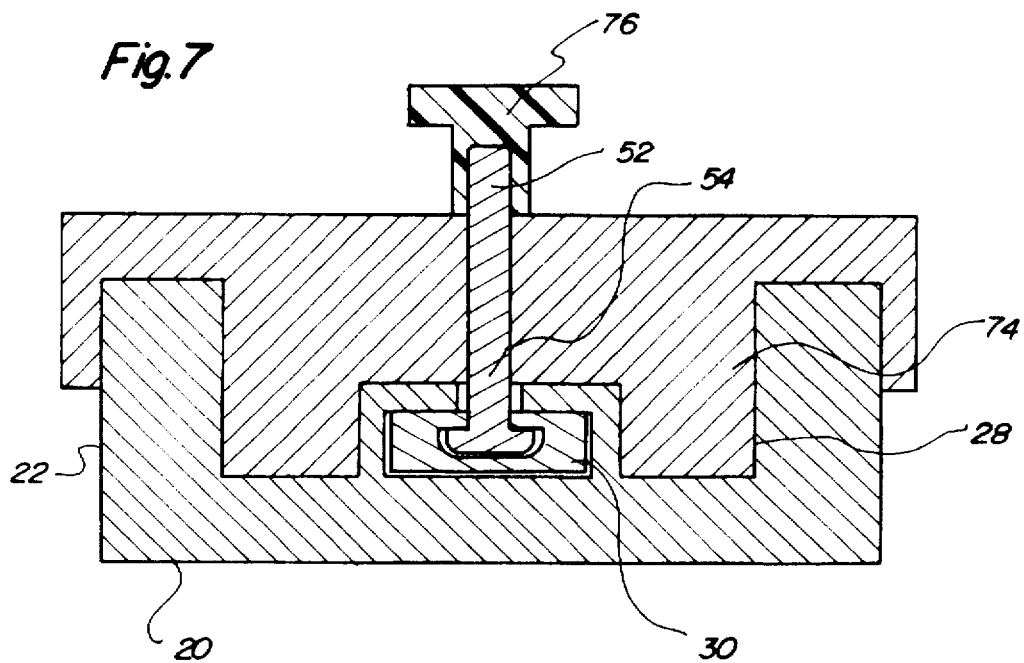
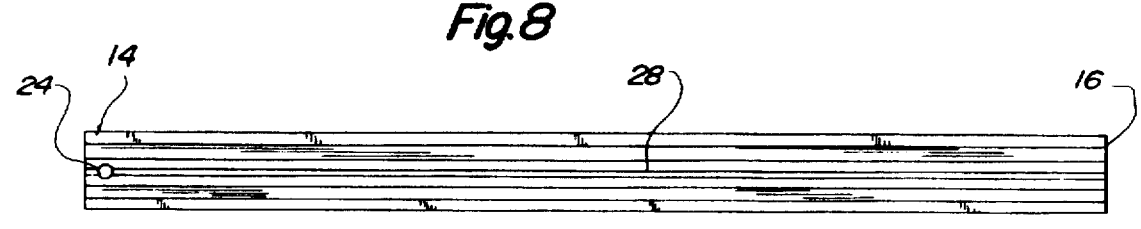
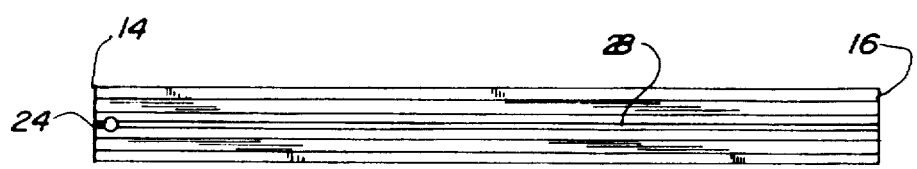

ADJUSTABLE ROUTER

BACKGROUND OF THE INVENTION

1. Field of the Invention

The present invention relates to an adjustable router and more particularly pertains to enabling an individual to cut perfect circles or arcs in pieces of wood with an adjustable router.

2. Description of the Prior Art

The use of router guides is known in the prior art. More specifically, router guides heretofore devised and utilized for the purpose of accurately guiding a router are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,240,052 to Davison discloses a precision router guide method and apparatus which includes a rectilinear guide member with an integral clamping assembly for securing the guide member to a work piece.

U.S. Pat. No. 5,121,554 to Havins discloses an apparatus and method for cutting precision angles. The invention is comprised of a miter gage apparatus.

U.S. Pat. No 4,977,938 to Greeson discloses a cutting guide for portable router that includes a guide fence for engaging a workpiece and providing a steady support for a variety of routing operations.

U.S. Pat. No. 4,112,987 to Pachnik discloses a radius router guide for permitting a router to cut a radius on the end of a piece of lumber.

U.S. Pat. No. 3,645,306 to Adams, Sr. discloses an angle guide for electric saw and router.

While these devices fulfill their respective, particular objective and requirements, the aforementioned patents do not describe an adjustable router for enabling an individual to cut perfect circles or arcs in pieces of wood.

In this respect, the adjustable router according to the present invention substantially departs from the conventional concepts and designs of the prior art, and in doing so provides an apparatus primarily developed for the purpose of enabling an individual to cut perfect circles or arcs in pieces of wood.

Therefore, it can be appreciated that there exists a continuing need for new and improved adjustable router which can be used for enabling an individual to cut perfect circles or arcs in pieces of wood. In this regard, the present invention substantially fulfills this need.

SUMMARY OF THE INVENTION

In the view of the foregoing disadvantages inherent in the known types of router guides now present in the prior art, the present invention provides an improved adjustable router. As such, the general purpose of the present invention, which will be described subsequently in greater detail, is to provide a new and improved adjustable router and method which has all the advantages of the prior art and none of the disadvantages.

To attain this, the present invention essentially comprises an elongated lower track having a first end and a second end. The elongated lower track has an upper surface, a lower surface, and two side surfaces. The first end has an aperture formed therethrough. The aperture allows the elongated lower track to be pivotally secured to a board by a nail. The upper surface comprises a track portion. The track portion has a securement portion extending along a middle portion thereof. One of the two side surfaces having an indicating arrow thereon. The device contains an elongated radius finder having a first end and a second end. The second end has a pencil notch therein. The elongated radius finder has an upper surface, a lower surface, and two side surfaces. The lower surface comprises a track portion adapted for removable slidable coupling with the track portion of the elongated lower track. The elongated radius finder has two locking knobs. The two locking knobs are secured inwardly of the first end of the radius finder. The two locking knobs have a first portion and a second portion. The first portion extends outwardly of the upper surface of the radius finder. The second portion extends outwardly of the track portion of the lower surface of the radius finder for adjustable engagement with the securement portion of the elongated lower track. One of the two side surfaces has a ruler thereon aligning with the indicating arrow on the elongated lower track. The device contains an elongated router track having a first end and a second end. The second end has a circular base secured thereto. The circular base has an aperture formed therethrough. The elongated router track has an upper surface, a lower surface, and two side surfaces. The lower surface comprises a track portion adapted for removable slidable coupling with the track portion of the elongated lower track. The elongated router track has two locking knobs. The two locking knobs are secured inwardly of the first end of the radius finder. The two locking knobs have a first portion and a second portion. The first portion extends outwardly of the upper surface of the router track. The second portion extends outwardly of the track portion of the lower surface of the router track for adjustable engagement with the securement portion of the elongated lower track. One of the two side surfaces has a ruler thereon aligning with the indicating arrow on the elongated lower track. A router is secured to the circular base of the elongated router track.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable router which has all the advantages of the prior art router guides and none of the disadvantages.

It is another object of the present invention to provide a new and improved adjustable router which may be easily and efficiently manufactured and marketed.

It is a further object of the present invention to provide a new and improved adjustable router which is of durable and reliable construction.

An even further object of the present invention is to provide a new and improved adjustable router which is susceptible of a low cost of manufacture with regard to both materials and labor, and which accordingly is then susceptible of low prices of sale to the consuming public, thereby making such an adjustable router economically available to the buying public.

Still yet another object of the present invention is to provide a new and improved adjustable router which provides in the apparatuses and methods of the prior art some of the advantages thereof, while simultaneously overcoming some of the disadvantages normally associated therewith.

Even still another object of the present invention is to provide a new and improved adjustable router for enabling an individual to cut perfect circles or arcs in pieces of wood.

Lastly, it is an object of the present invention to provide a new and improved adjustable router comprised of a lower track having an aperture formed therethrough. The aperture allows the elongated lower track to be pivotally secured to a board by a nail. One of two side surfaces of the lower track has an indicating arrow thereon. A router track has a circular base secured to an end portion thereof. The circular base has an aperture formed therethrough. The router track is adapted for removable slidable coupling with the lower track. The elongated router track has two locking knobs for adjustable engagement with the lower track. One of two side surfaces has a ruler thereon aligning with the indicating arrow on the elongated lower track.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the preferred embodiment of the adjustable router constructed in accordance with the principles of the present invention.

FIG. 4 is a side elevation view of the present invention.

FIG. 7 is a cross-sectional view as taken along line 7—7 of FIG. 3.

FIG. 8 is a plan view of the lower track of the present invention in different sizes.

The same reference numerals refer to the same parts through the various Figures.

DESCRIPTION OF THE PREFERRED EMBODIMENT

Figure 1:
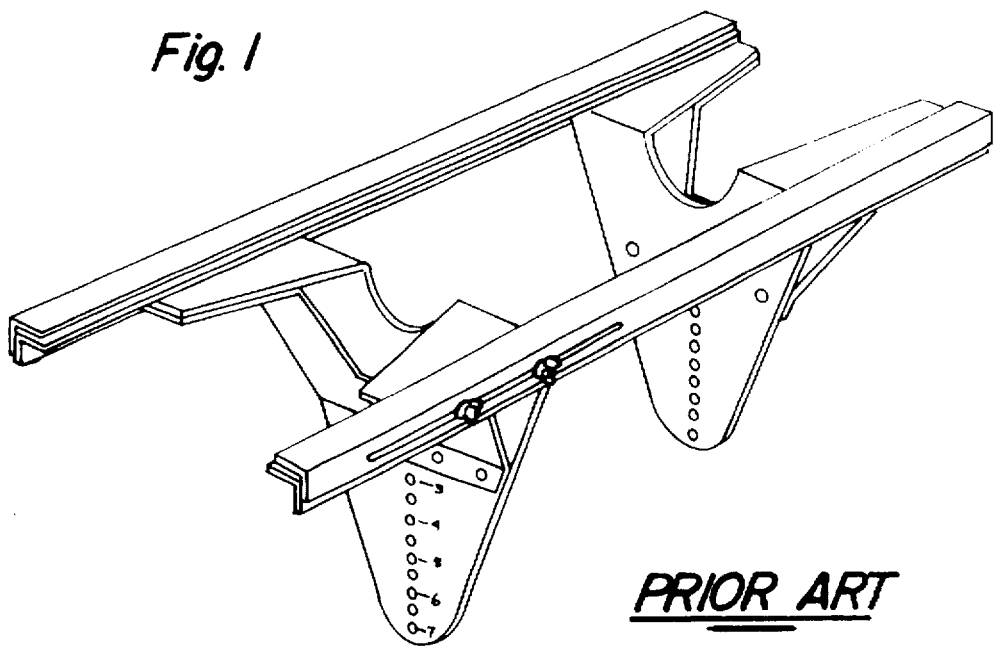
FIG. 1 is a perspective view of the prior art radius router guide.
Figure 2:
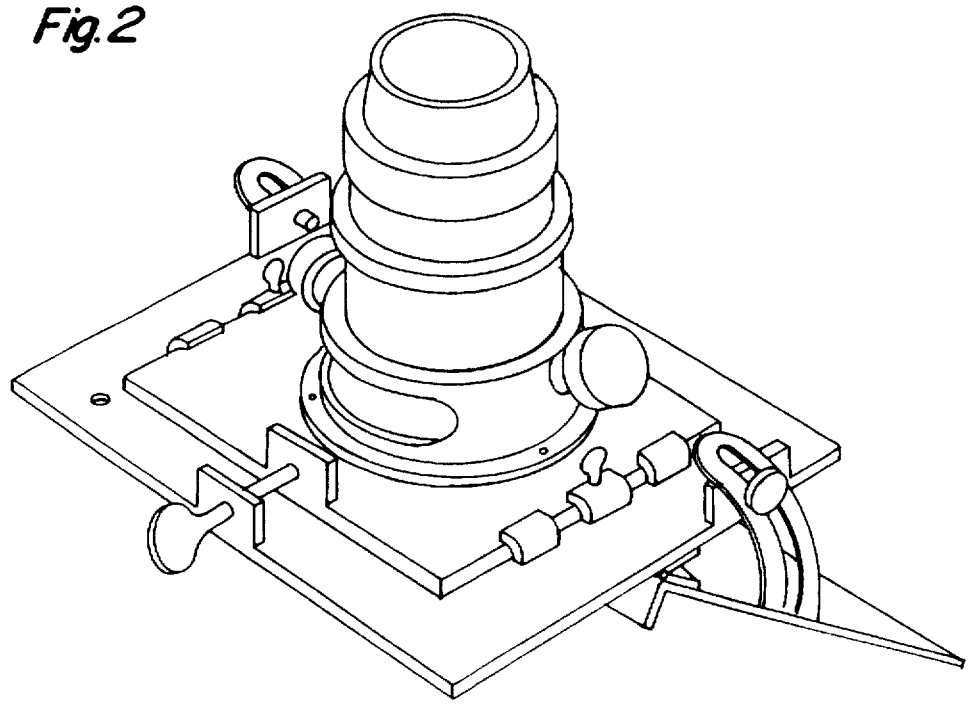
FIG. 2 is a perspective view of a top side of the prior art cutting guide for portable router.
Figure 5:
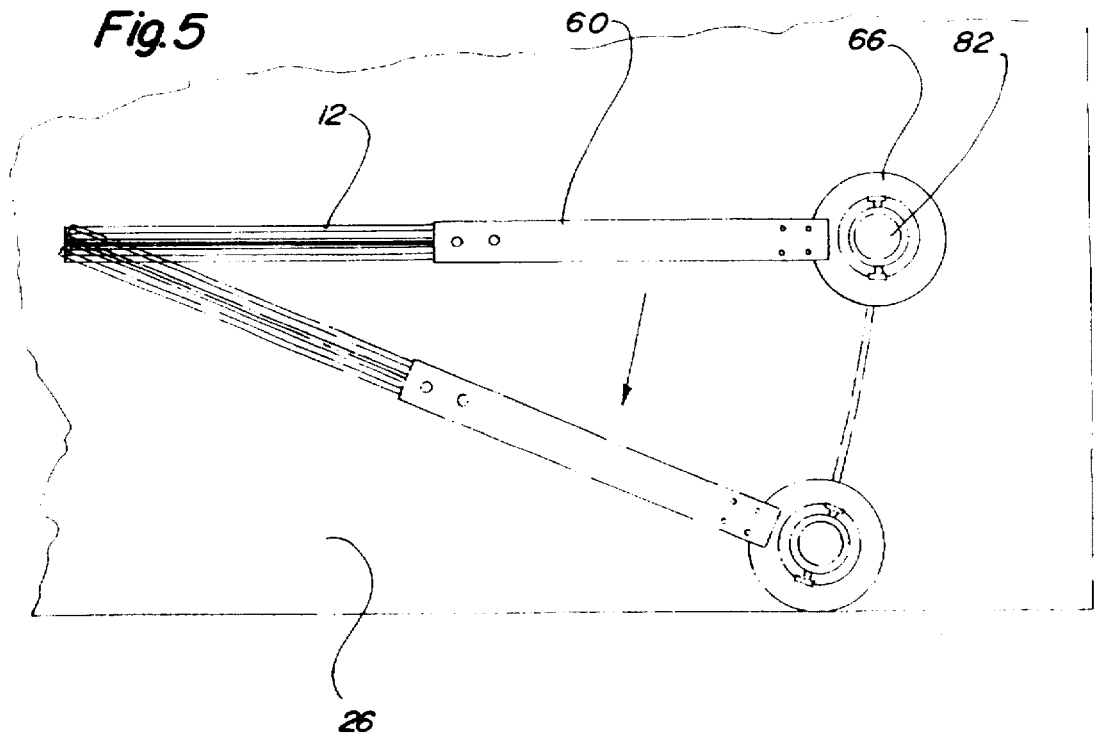
FIG. 5 is a plan view of the present invention in use cutting a board.
Figure 6:
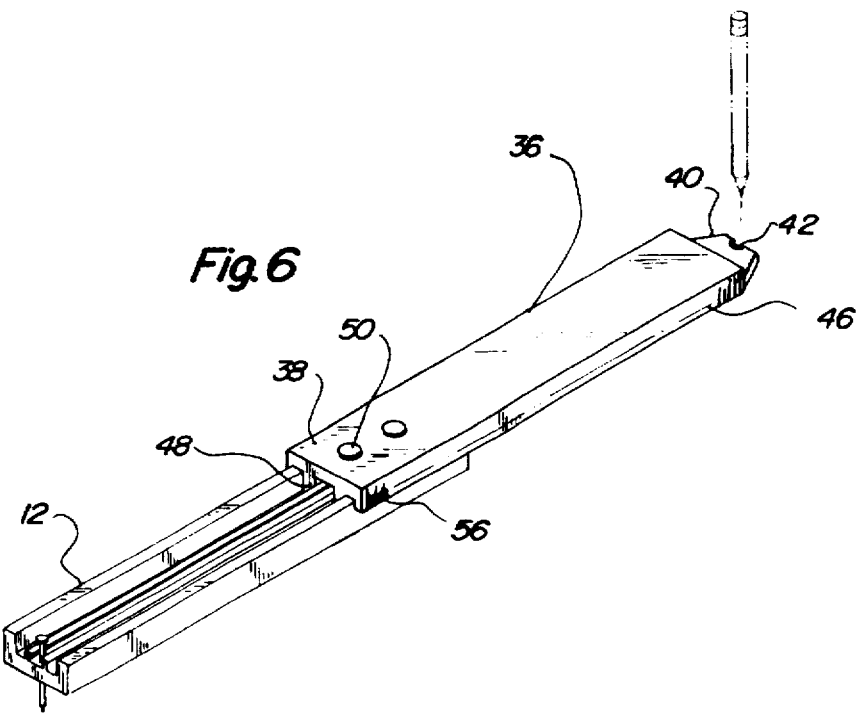
FIG. 6 is a perspective view of the radius finder of the present invention.

With reference now to the drawings, and in particular, to FIG. 3–8 thereof, the preferred embodiment of the new and improved adjustable router embodying the principles and concepts of the present invention and generally designated by the reference number 10 will be described.

Specifically, it will be noted in the various Figures that the device relates to a new and improved adjustable router for enabling an individual to cut perfect circles or arcs in pieces of wood. In its broadest context, the device consists of an elongated lower track, an elongated radius finder, an elongated router track, and a router.

The device 10 contains an elongated lower track 12 having a first end 14 and a second end 16. The elongated lower track 12 can be fabricated in a variety of lengths. The elongated lower track 12 has an upper surface 18, a lower surface 20, and two side surfaces 22. The first end 14 has an aperture 24 formed therethrough. The aperture 24 allows the elongated lower track 12 to be pivotally secured to a board 26 by a nail 28. By nailing the first end 14 of the elongated lower track 12 into the board 26, the lower track 12 is able to rotate around a full 360 degrees or a portion thereof. The upper surface 18 comprises a track portion 28. The track portion 28 has a securement portion 30 extending along a middle portion thereof. One of the two side surfaces 22 having an indicating arrow 32 thereon.

The device 10 contains an elongated radius finder 36 having a first end 38 and a second end 40. The second end 40 has pencil groove or preferably notch 42 therein. The second end 40 extends away from the elongated radius finder 36 in a triangular configuration. The elongated radius finder 36 has an upper surface, a lower surface 44, and two side surfaces 46. The lower surface 44 comprises a track portion 48 adapted for removable slidable coupling with the track portion 28 of the elongated lower track 12. The elongated radius finder 36 has two locking knobs 50. The two locking knobs 50 are secured inwardly of the first end 38 of the radius finder 36. The two locking knobs 50 have a first portion 52 and a second portion 54. The first portion 52 extends outwardly of the upper surface of the radius finder 36. The second portion 54 extends outwardly of the track portion 48 of the lower surface 44 of the radius finder for adjustable engagement with the securement portion 30 of the elongated lower track 12. By loosening the two locking knobs 50, the length of the elongated radius finder 36 can be adjusted to a radius suitable for a user. After the length of the radius has been determined, the two locking knobs are tightly secured to the lower track 12 and a pencil, or other writing implement, is inserted through the pencil notch 42 and a circle is made to outline an area to be cut. One of the two side surfaces 46 has a ruler 56 thereon aligning with the indicating arrow 32 on the elongated lower track 12. The ruler 56 allows the user to accurately measure the length of the radius in relation to the elongated lower track 12. The length of the elongated radius finder 36 can be constructed in a variety of lengths to correlate with various sized radius'.

The device 10 contains an elongated router track 60 having a first end 62 and a second end 64. The second end 64 has a circular base 66 secured thereto. The circular base 66 has an aperture formed therethrough. The circular base 66 is adapted for a router to be secured thereto with a blade of the router extending through the aperture formed through the circular base 66. The elongated router track 60 has an upper surface 68, a lower surface 70, and two side surfaces 72. The lower surface 70 comprises a track portion 74 adapted for removable slidable coupling with the track portion 28 of the elongated lower track 12. The elongated router track 60 has two locking knobs 76. The two locking knobs 76 are secured inwardly of the first end 62 of the radius finder 60. The two locking knobs 76 have a first portion 52 and a second portion 54. The first portion 52 extends outwardly of the upper surface 68 of the router track 60. The second portion 54 extends outwardly of the track portion 74 of the lower surface 70 of the router track 60 for adjustable engagement with the securement portion 30 of the elongated lower track 12. One of the two side surfaces 72 has a ruler 78 thereon aligning with the indicating arrow 32 on the elongated lower track 12. After the radius has been etched or drawn on the board 26 by the elongated radius finder 36, the elongated radius finder 36 is then detached from the elongated lower base 12 and the elongated router track is secured to the lower track 12 by the two locking knobs at the desired length as indicated by the ruler 78. By attaching a router to the circular base 66, a perfect cut can then be made.

A router 82 is secured to the circular base 66 of the elongated router track 60. The router 82 is an optional accompaniment to the device 10. Many individuals who presently own their own router's will not desire an extra one.

The present invention is an adjustable jig for a router 82 that enables an individual to cut perfect circles or arcs in pieces of wood.

The attachment has three interlocking one inch wide aluminum tracks, a circular base 66 that holds the router 82, and an additional base that holds a radius finder 36. To cut circles or arcs of various radii, three different track lengths are needed; two to four feet, four to eight feet, and eight to sixteen feet. To accurately adjust the cut, a ruler 56 is provided on the side of the radius finder 36 and a pointer on the bottom. Two locking knobs 50 hold the radius finder 36 at a fixed length to ensure consistency. The circular base 66 is a ten inch diameter, ¼ inch thick plastic plate that attaches to the router track 60. The radius finder 36 is a plastic plate with a notch 42 for a pencil to trace the arc prior to cutting.

Use the device 10 to make round walls, window and hallway arches, or circular staircases. Determine the center point of the arc to be cut and install a nail 28 through the end of the radius finder 36 and into the board 26. After setting the length of the tracks with the ruler 56 and indicating arrow 32, lock them together by turning the knobs 50. Attach the radius finder 36 and draw an arc on the board 26 by rotating the device 10 around the nail 28. Install the router track 60 and use the jig to follow the pencil mark.

This simple and timesaving tool enables woodworkers, carpenters, and homeowners to consistently cut circles or arcs with radii up to sixteen feet.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An adjustable router for enabling an individual to cut perfect circles or arcs in pieces of wood comprising, in combination:

an elongated lower track having a first end and a second end, the elongated lower track having an upper surface, a lower surface, and two side surfaces, the first end having an aperture formed therethrough, the aperture allowing the elongated lower track to be pivotally secured to a board by a nail, the upper surface comprising a track portion, the track portion having a securement portion extending along a middle portion thereof, one of the two side surfaces having an indicating arrow thereon;

an elongated radius finder having a first end and a second end, the second end having pencil notch therein, the second end extending from the elongated radius finder in a triangular configuration, the elongated radius finder having an upper surface, a lower surface, and two side surfaces, the lower surface comprising a track portion adapted for removable slidable coupling with the track portion of the elongated lower track, the elongated radius finder having two locking knobs, the two locking knobs secured inwardly of the first end of the radius finder, the two locking knobs having a first portion and a second portion, the first portion extending outwardly of the upper surface of the radius finder, the second portion extending outwardly of the track portion of the lower surface of the radius finder for adjustable engagement with the securement portion of the elongated lower track, one of the two side surfaces having a ruler thereon aligning with the indicating arrow on the elongated lower track;

an elongated router track having a first end and a second end, the second end having a circular base secured thereto, the circular base having an aperture formed therethrough, the elongated router track having an upper surface, a lower surface, and two side surfaces, the lower surface comprising a track portion adapted for removable slidable coupling with the track portion of the elongated lower track, the elongated router track having two locking knobs, the two locking knobs secured inwardly of the first end of the radius finder, the two locking knobs having a first portion and a second portion, the first portion extending outwardly of the upper surface of the router track, the second portion extending outwardly of the track portion of the lower surface of the router track for adjustable engagement with the securement portion of the elongated lower track, one of the two side surfaces having a ruler thereon aligning with the indicating arrow on the elongated lower track;

a router secured to the circular base of the elongated router track.

* * * * *